US006821201B2

(12) United States Patent
Bombardi et al.

(10) Patent No.: US 6,821,201 B2
(45) Date of Patent: Nov. 23, 2004

(54) DEVICE AND A METHOD FOR SUPPLYING CONDITIONED AIR TO AN AIRCRAFT

(75) Inventors: Harry G. Bombardi, Beavercreek, OH (US); Danny L. Lyons, Jamestown, OH (US)

(73) Assignee: BoomAir, L.L.C., Beavercreek, OH (US)

( * ) Notice: Subject to any disclaimer, the term of this patent is extended or adjusted under 35 U.S.C. 154(b) by 325 days.

(21) Appl. No.: 09/799,144

(22) Filed: Mar. 5, 2001

(65) Prior Publication Data

US 2002/0121308 A1 Sep. 5, 2002

(51) Int. Cl.⁷ .............................................. B61D 27/00
(52) U.S. Cl. ...................................... 454/75; 454/119
(58) Field of Search ................................. 138/106, 114; 454/71, 76, 119; 248/49

(56) References Cited

U.S. PATENT DOCUMENTS

| | | | |
|---|---|---|---|
| 2,599,423 A | | 6/1952 | Ziegler |
| 3,399,545 A | * | 9/1968 | Anderson et al. .............. 62/237 |
| 4,319,376 A | * | 3/1982 | Saunders ...................... 14/71.5 |
| 4,357,860 A | * | 11/1982 | Krzak ........................... 454/71 |
| 4,526,090 A | * | 7/1985 | Maier ........................... 454/119 |
| 4,534,384 A | | 8/1985 | Graham et al. |
| 4,620,339 A | * | 11/1986 | Shepheard ..................... 14/71.5 |
| 4,655,399 A | | 4/1987 | Harvey ......................... 239/745 |
| 4,715,077 A | * | 12/1987 | Shepheard ..................... 14/71.5 |
| 5,162,018 A | * | 11/1992 | Horton ........................... 454/76 |
| 5,328,152 A | * | 7/1994 | Castle ........................... 251/229 |

FOREIGN PATENT DOCUMENTS

| | | |
|---|---|---|
| DE | 2615827 | 10/1977 |
| DE | 4442513 | 8/1995 |
| EP | 0 446 653 A1 | 8/2001 |
| EP | 1184279 A1 | 8/2001 |
| GB | 1166842 | 10/1969 |
| GB | 2199304 | 7/1988 |
| GB | 2308840 A | 11/1995 |
| JP | 2140545 | 5/1990 |

* cited by examiner

Primary Examiner—Derek S. Boles
(74) Attorney, Agent, or Firm—Patents & TMS, P.C.

(57) ABSTRACT

The present invention generally relates to a device and a method for supplying conditioned air for heating and/or cooling to an aircraft. More specifically, the present invention provides a hose in a container and a retractor. The retractor may engage the hose and pull the hose from the container. The container may deliver the hose to the aircraft via the retractor. In addition, the retractor may also retract the hose into the container when the hose is not needed. Further, the retractor may be released from the hose and container, allowing the hose to be pulled manually from the container.

20 Claims, 2 Drawing Sheets

DEVICE AND A METHOD FOR SUPPLYING CONDITIONED AIR TO AN AIRCRAFT

BACKGROUND OF THE INVENTION

The present invention generally relates to a device and a method for supplying conditioned air for heating and cooling to an aircraft. More specifically, the present invention provides a supply hose in a protected container. The container may deliver the required length of hose to the aircraft and retract the hose when the hose is not needed.

It is, of course, generally known to supply commercial aircraft with conditioned air for heating and cooling. Typically, conditioned air is supplied to the aircraft from a jetway. The air is delivered with a flexible air hose. The supply hose is typically seventy feet in length. When not in use, the supply hose is stored in a bin under the jetway. Occasionally, when time permits, a worker may roll the hose into a wound roll before storing the hose in the bin. Often, an individual leaves the hose in a pile in the bin, thereby increasing undue wear of the hose and significantly affecting the performance of the hose when in use.

In addition, while all aircraft have a standard connector, this connector is not located at the same point on all aircraft. Further, the jetway is not always located at the same distance from the aircraft. Some aircraft require seventy feet of supply hose for the conditioned air to reach the aircraft from the jetway while others may only require twenty feet. All seventy feet of the supply hose must be removed from the bin regardless of how much hose is required. Whenever less than seventy feet of the hose is required, the hose may be bent and kinked between the jetway and aircraft. A bent hose and/or kinked hose causes a reduction in airflow to the aircraft which, in turn, reduces the efficiency of the heating or cooling. In some cases, the aircraft cannot be adequately heated or cooled using air supplied by the jetway. Additionally, spreading the supply hose on the ramp causes safety problems and undue wear.

A need, therefore, exists for a device and a method for supplying conditioned air for heating and/or cooling to a commercial aircraft that may supply a hose of the appropriate length and that may retract the hose when the hose is no longer needed.

SUMMARY OF THE INVENTION

The present invention generally relates to a device and a method for supplying conditioned air for heating and cooling to an aircraft.

To this end, in an embodiment, an apparatus for providing conditioned air to an aircraft is provided. The apparatus has a housing having a length defined by a first end and a second end. A flexible hose is provided within the housing. An inner tube is also provided within the housing and the inner tube has a length defined by a top and a bottom. Further, a drive unit is provided attached to the housing.

In an embodiment, the top of the inner tube extends outside the first end of the housing and the bottom of the inner tube extends outside the second end of the housing.

In another embodiment of the present invention, a wheel is provided attached near the second end of the housing.

In another embodiment, a motor is provided attached to the drive unit.

In another embodiment, a hose is provided wherein the hose extends between the inner tube and the housing.

In yet another embodiment, a finger is provided located between the inner tube and the drive unit.

In an embodiment, the housing is in a horizontal position.

In another embodiment, the housing is in a vertical position.

Moreover, in an embodiment of the present invention, an apparatus for retracting a hose is provided. The apparatus has a housing and a drive unit associated with the housing. The drive unit has a belt. The drive unit retracts the hose into the housing.

In an embodiment, a motor is provided attached to the drive unit wherein the drive unit is powered by the motor.

In an embodiment, the drive unit has a cover.

In another embodiment, the drive unit has a plurality of rollers.

In an embodiment, drive unit has a plate. In yet another embodiment, the belt of the drive unit is formed with grooves.

Moreover, in an embodiment of the present invention, an apparatus is provided for retracting a hose. The apparatus has a drive unit. The drive unit has a belt and the belt has a plurality of grooves. A flexible hose having ribs is provided wherein the ribs correspond to the plurality of grooves of the belt.

In an embodiment, a motor is provided attached to the drive unit.

Moreover, in an embodiment of the present invention, a method for supplying conditioned air to an aircraft is provided. The method is comprised of the steps of providing a hose, storing the hose in a housing, extracting the hose from the housing, attaching the housing to a source of conditioned air and attaching the hose to an aircraft.

In an embodiment, the method is further comprised of the step of In an embodiment, the method is further comprised of the step of releasing the hose from the aircraft.

In an embodiment, the method is further comprised of the step of retracting the hose into the housing.

In another embodiment, the method is further comprised of the step of attaching a wheel to the housing.

In yet another embodiment, the method is further comprised of the step of attaching a relief hose between the housing and a source of conditioned air.

It is, therefore, an advantage of the present invention to provide a device and method for supplying conditioned air to an aircraft with a hose in a protected container.

Another advantage of the present invention is to provide a device and method with a hose in a protected container to reduce undue wear of the hose and maintenance performance of the hose.

Another advantage of the present invention is to provide a device and method where only the necessary amount of hose may be provided to supply an aircraft with conditioned air.

Still further, an advantage of the present invention is to provide a device and a method that increases safety by storing unused portions of the hose in a container instead of spreading the unused hose on the ground.

Another advantage of the present invention is to provide a device and method for a wheel on the container such that the container and hose may be rotated to different positions and/or locations.

Another advantage of the present invention is to provide a device and method for positioning the housing with the hose in a vertical or horizontal position.

Another advantage of the present invention is to provide a device and method for a retractor that retracts the hose into or out from the housing.

Still further, an advantage of the present invention is to provide a device and method for a belt having grooves equally spaced to fit around the ribs of the hose.

Additional features and advantages of the present invention are described in, and will be apparent from, the detailed description of the presently preferred embodiments and from the drawings.

DETAILED DESCRIPTION OF THE PRESENTLY PREFERRED EMBODIMENTS

The present invention generally relates to a device and a method for supplying conditioned air for heating and/or cooling to an aircraft. More specifically, the present invention provides a supply hose in a protected container and a retractor. The container may deliver the required length of hose to the aircraft via the retractor. The retractor may engage the hose and pull the hose from the container. In addition, the retractor may also retract the hose into the container when the hose is not needed. Further, the retractor may be released from the hose and container, allowing the hose to be pulled manually from the container.

Figure 1:
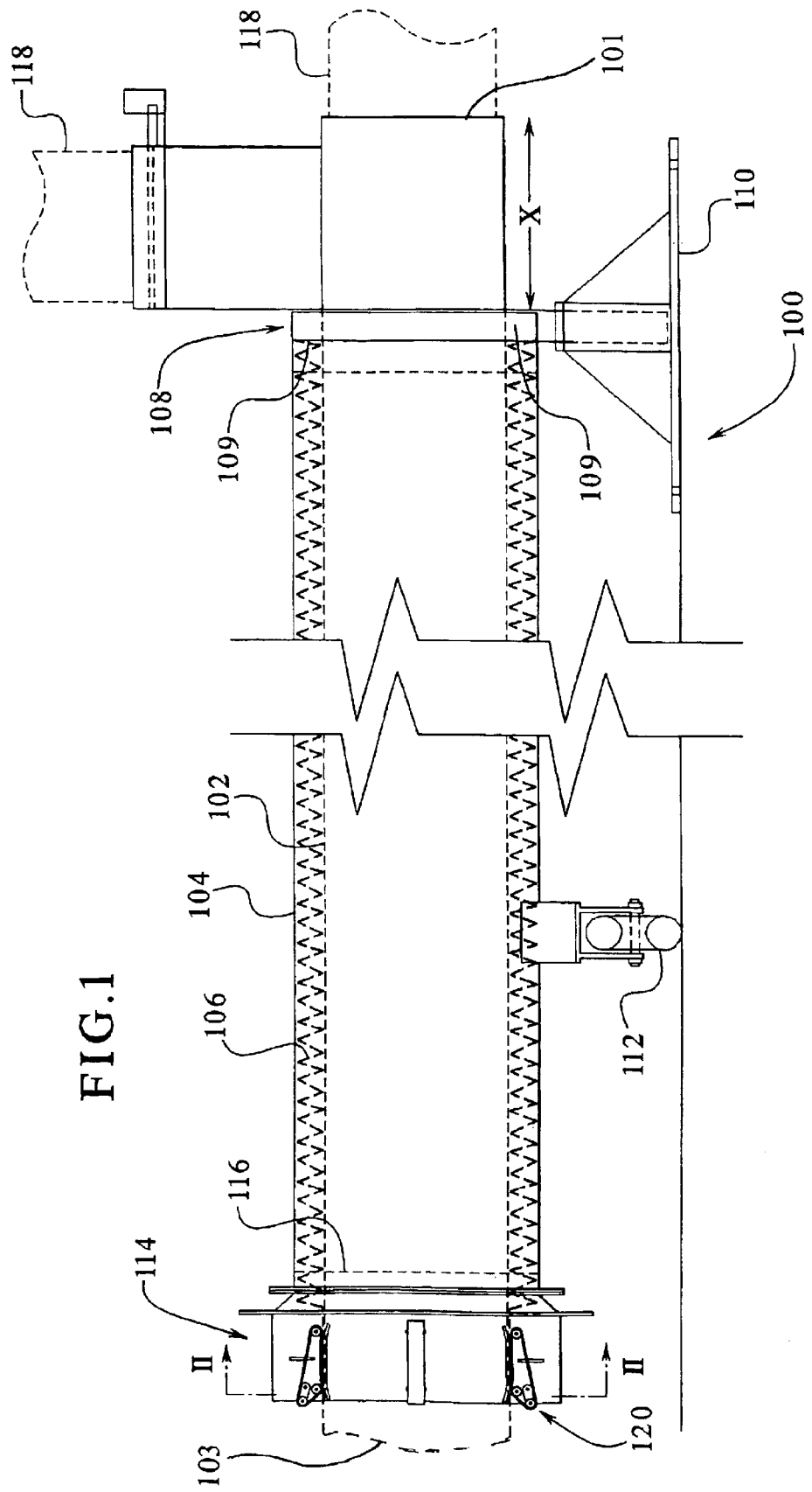
FIG. 1 illustrates a cross-sectional view of a device for supplying conditioned air to an aircraft.

Referring now to the drawings wherein like numerals refer to like parts, FIG. 1 generally illustrates a device 100 for supplying conditioned air to an aircraft. The device 100 may have an inner tube 102 within a housing 104, a flexible hose 106 and a retractor 114. The inner tube 102 may have a length defined by a top 101 and a bottom 103. The inner tube 102 may be constructed of metal, mylar, or any other like material that provides a smooth surface and sufficient strength to support a flexible hose 106. The housing 104 may have a first end 108 and a second end 116. The housing 104 may be cylindrical in shape and constructed of sheet metal, plastic or the like. The housing 104 may be supported by a base 110 at the first end 108 and by a tire 112 at a point near the second end 116.

Figure 4:
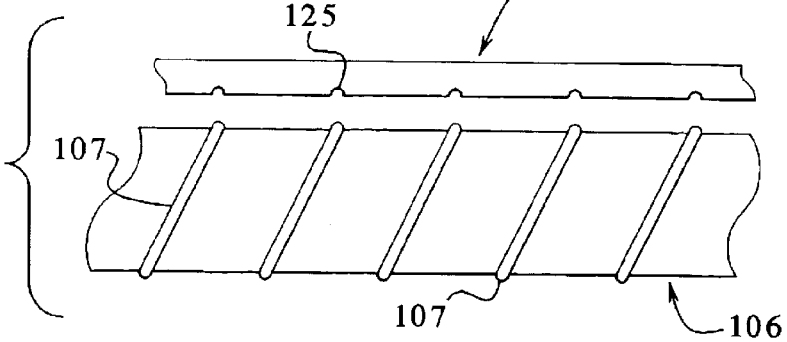
FIG. 4 illustrates a side view of a belt and hose in an embodiment of the present invention.

The flexible hose 106 is preferably seventy feet in length and may be stored within the housing 104 and surrounding the inner tube 102. The inner tube 102 may provide support for the flexible hose 106 and the inner tube 102 may supply conditioned air to the flexible hose 106 from a source, such as, for example, a jetway. The flexible hose 106 is generally known in the industry, such as a hose constructed by Flexfab®. A coil 107 may be integrally formed with the flexible hose 106 such that the flexible hose 106 may be compressed and/or expanded much like a spring may be compressed and/or expanded (as shown in FIG. 4). The flexible hose 106 may be compressed, for example, up to ⅙ of its length when the hose 106 is stored entirely in the device 100.

The first end 108 of the housing 104 may be attached to the base 110. The inner tube 102 may extend a distance "X" past the first end 108 of the housing 104. A starting end 109 of the flexible hose 106 may be located at the first end 108 of the housing 104. Alternatively, the starting end 109 of the flexible hose 106 may be located at the second end 116 of the housing 104.

The inner tube 102 may receive conditioned air, for example, from a source, such as, for example, a jetway (not shown). The inner tube 102 may be mounted directly to the source or may be connected to a relief hose 118 or other apparatus that delivers conditioned air from the source to the inner tube 102. The device 100 may be used in a horizontal position as shown in FIG. 1, or may be rotated to a vertical position and mounted to the source. Additionally, when in the horizontal position, the device 100 may be movable via the tire 112 such that the second end 116 may rotate about the first end 108 of the device 100. The retractor 114 may be attached to the second end 116 of the housing 104 and will be described in detail hereinafter.

Figure 2:
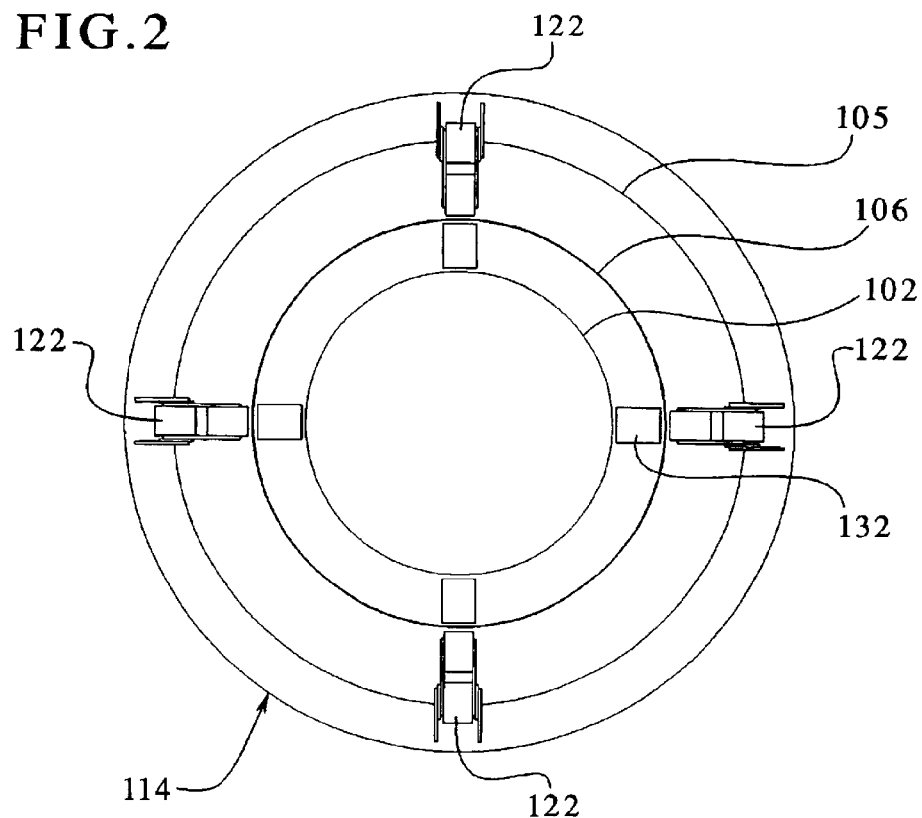
FIG. 2 illustrates a cross-sectional view of a retractor in an embodiment of the present invention.

Referring now to FIG. 2, a cross-sectional view of the retractor 114 is shown taken along lines II—II of FIG. 1. The retractor 114 may have four drive units 122 placed around the inner tube 102. Preferably, the drive units 122 are identical. Fingers 132 may be located between the inner tube 102 and the flexible hose 106. Further, the flexible hose 106 may be located between the fingers 132 and the drive units 122.

Figure 3:
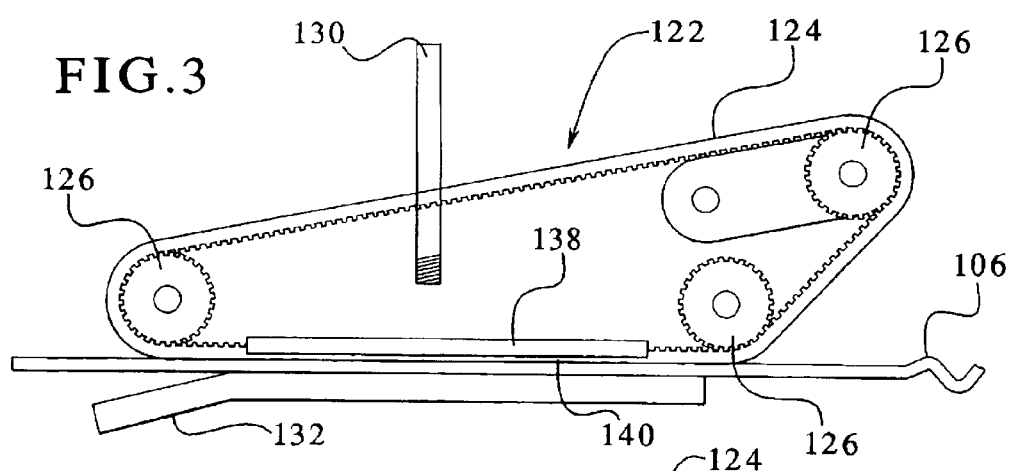
FIG. 3 illustrates a side view of a drive unit in an embodiment of the present invention.

The drive units 122, as shown in FIG. 3, may have a belt 124. Preferably, the belt 124, is constructed of rubber. The belt 124 may cover several cog rollers 126. One or all of the drive units 122 may be powered by a motor (not shown). Four adjustable springs 130, two on each side of the belt 124, may be used to provide tension on the belt 124. Additional rollers 136, or preferably, a plate 138, may be located between two cog rollers 126. The belt 124 may cover the cog rollers 126, and the plate 138 may cover the belt 124. The plate 138 may have a groove 140 in which the belt 124 may be covered. When in motion, the belt 124 may move in the groove 140. The plate 138 may serve to maintain the belt 124 in place. The drive units 122 may apply pressure to the flexible hose 106. The flexible hose 106 may be located between the belt 124 in the groove 140 of the plate 138 of the drive unit 122 and the fingers 132.

Referring again to FIG. 2, the fingers 132 may be located on the inner tube 102 and may extend from the second end of the inner tube 102 to a point outside of the retractor 114. The fingers 132 may be constructed of, for example, Teflon®, plastic, steel, or any like smooth material. The fingers 132 may guide the flexible hose 106 and may keep the flexible hose 106 from kinking. The fingers 132 may preferably be used when the device 100 is in a horizontal position and may not be necessary if the device 100 is implemented in a vertical position.

The cog rollers 126, powered by the motor of the drive unit 122, may propel the belt 124. The motor (not shown) may be hydraulic, electric, pneumatic or the like. Moreover, the drive units 122 may be powered by a single motor, or each drive unit 122 may be powered by a motor. The rotation of the belt 124 may propel the flexible hose 106 between the belt 124 and the fingers 132 onto the inner tube 102 of the device 100. Reversing the direction of the belt 124 may slide the flexible hose 106 out of the device 100. In addition, the device 100 may have a handle (not shown) that may release the pressure of the drive units 122 from the flexible hose 106 and may allow a person to manually pull the flexible hose 106 from the device 100.

Referring to FIG. 4, the flexible hose 106 may be integrally formed with a coil 107 to help support the flexible hose 106. Accordingly, the belt 124 may be manufactured with grooves 125 that may catch the coil 107 of the flexible hose 106 to allow for an easier pull of the flexible hose 106 through the retractor 114. Preferably, the grooves 125 are evenly spaced at a distance between adjacent grooves 125 to correspond to the coil 107 of the flexible hose 106.

An embodiment of the present invention may also incorporate the steps of a method for supplying conditioned air for heating and cooling to an aircraft. The flexible hose 106 may be pulled via a retractor 114 from the inner tube 102 and the housing 104. Alternatively, the flexible hose 106 may be pulled from the inner tub 102 and the housing 104 manually. By using a handle (not shown), a person may release the tension applied by the retractor 114 on the flexible hose 106 and then may manually pull the flexible hose 106 from the device 100. However, the device 100 may be designed to accept the flexible hose 106 for storage between the inner tube 102 and the housing 104 by use of the retractor 114.

The flexible hose 106 may be pulled from the device 100 to extend to its full length or a smaller length, whichever may be needed. The necessary length may be dependent on where a connector (not shown) on an aircraft (not shown) may be located and/or the distance of the aircraft form the source of conditioned air, such as a jetway. Some aircraft require seventy feet of flexible hose 106 while other aircraft require only twenty feet of flexible hose 106 for the source of conditioned air to reach the aircraft. Extracting only the necessary amount of the flexible hose 106 eliminates excess flexible hose 106 on the ramp where the flexible hose 106 may bend. Bending of the flexible hose 106 affects the pressure of the conditioned air and/or subjects the flexible hose 106 to additional unnecessary wear and tear.

After the necessary amount of the flexible hose 106 is removed from the device 100, the unattached end of the flexible hose 106 may be attached to the connector of the aircraft. The inner tube 102 that extends to a point beyond the first end 108 of the housing 104 of the device 100 may be attached to a relief hose 118, or alternatively, may be mounted directly to the source (not shown).

After the flexible hose 106 is attached to the aircraft, and the device 100 is attached to the source of conditioned air, such as a jetway, (either directly or by a relief hose 118), conditioned air may then be supplied to the device 100. Conditioned air may be supplied to the inner tube 102 of the device 100 by either the relief hose 118 attached to the source or directly by the source. The conditioned air may be forced through the inner tube 102 towards the second end 116 of the housing 104.

After the conditioned air travels the length of the inner tube 102, the conditioned air may reach the flexible hose 106. The conditioned air may continue to travel through the flexible hose 106 to the aircraft. After the aircraft is supplied with the necessary amount of conditioned air, the flexible hose 106 may be removed from the aircraft and may be retracted into the device 100 for storage and/or subsequent use of the device 100.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

We claim:

1. An apparatus for providing conditioned air to an aircraft, the apparatus comprising:
    a housing;
    a flexible hose within the housing wherein the flexible hose is defined by a length between a first end and a second end;
    an inner tube within the housing wherein the inner tube has a length defined by a top and a bottom; and
    a drive unit attached to the housing wherein the drive unit engages the flexible hose and further wherein the drive unit expands the length of the flexible hose outward with respect to the housing.

2. The apparatus of claim 1 wherein the top of the inner tube extends outside the first end of the housing and the bottom of the inner tube extends outside the second end of the housing.

3. The apparatus of claim 1 further comprising:
    a wheel attached near the second end of the housing.

4. The apparatus of claim 1 further comprising:
    a motor attached to the drive unit.

5. The apparatus of claim 1 further comprising:
    a hose wherein the hose extends between the inner tube and the housing.

6. The apparatus of claim 1 further comprising:
    a finger located between the inner tube and the drive unit.

7. The apparatus of claim 1 wherein the housing is in a horizontal position.

8. The apparatus of claim 1 wherein the housing is in a vertical position.

9. A method for supplying conditioned air to an aircraft, the method comprising the steps of:
    providing a hose having a length defined between a first and a second end;
    storing the hose in a housing;
    attaching the first end of the hose and the housing to a source of conditioned air;
    extending the second end of the hose in a direction away from the source of conditioned air wherein the housing is stationary with respect to the source of conditioned air such that the hose is withdrawn from the housing to extend from the housing to the aircraft; and
    attaching the second end of the hose to the aircraft.

10. The method of claim 9 further comprising the step of:
    releasing the hose from the aircraft.

11. The method of claim 9 further comprising the step of:
    retracting the hose into the housing.

12. The method of claim 9 further comprising the step of:
    attaching a wheel to the housing.

13. The method of claim 9 further comprising the step of:
    attaching a relief hose between the housing and a source of conditioned air.

14. An apparatus for providing conditioned air from a first environment to a second environment, the apparatus comprising:
    a housing having a length defined by a first end and a second end;
    a flexible hose within the housing;
    an inner tube within the housing wherein the inner tube has a length defined by a top and a bottom; and
    a drive unit attached to the housing wherein the drive unit engages the flexible hose to move the flexible hose in a direction outward with respect to the housing and further wherein the housing is fixed with respect to the inner tube.

15. The apparatus of claim 14 wherein the top of the inner tube extends outside the first end of the housing and the bottom of the inner tube extends outside the second end of the housing.

16. The apparatus of claim 14 further comprising:

a motor attached to the drive unit.

17. A method for supplying conditioned air from a first environment to a second environment, the method comprising the steps of:

provding a hose having a length defined between a first end and second end;

storing the hose in a housing wherein the housing has a top end and a bottom end wherein the first end of the hose is connected to the top end of the housing and further wherein the length of the hose is compressed in the housing;

attaching the first end of the housing to a source of conditioned air;

withdrawing the second end of the hose from the housing in a direction outward with respect to the second end of the housing such that the hose extends to the second environment; and attaching the hose to the second environment.

18. The method of claim 17 further comprising the step of:

releasing the hose from the second environment.

19. The method of claim 17 further comprising the step of:

retracting the hose into the housing.

20. The method of claim 17 further comprising the step of:

attaching a relief hose between the housing and the source of conditioned air.

\* \* \* \* \*